J. W. EVANS.
Steam-Plow.
No. 21,661.  Patented Oct. 5, 1858.
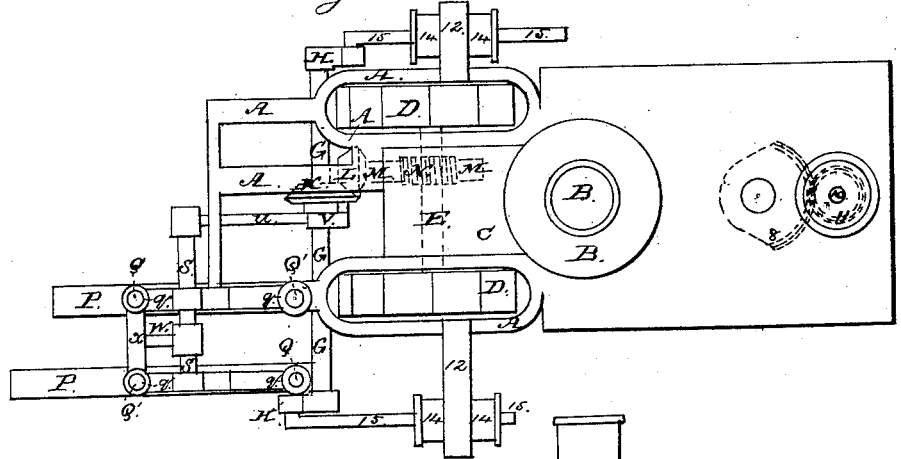
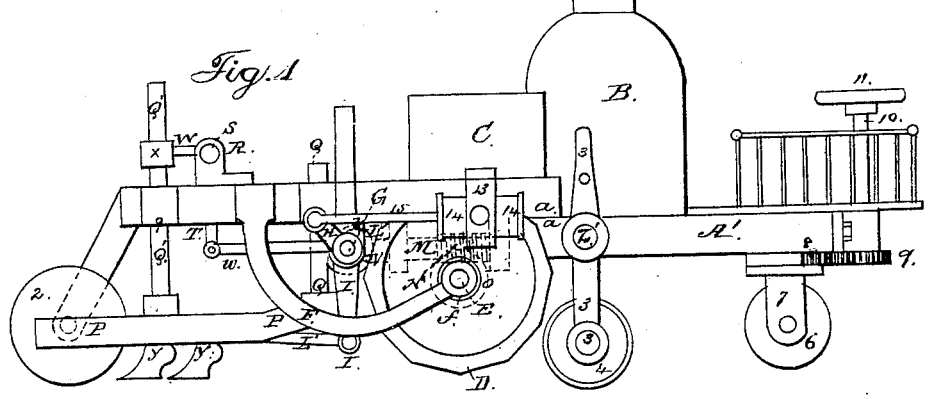
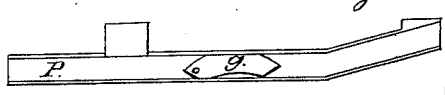
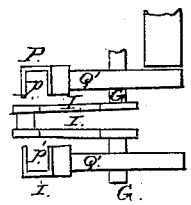
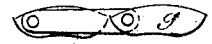
WITNESSES:
J. B. Staples
G. W. Fox
INVENTOR:
James W. Evans

UNITED STATES PATENT OFFICE.

JAS. W. EVANS, OF NEW YORK, N. Y.

IMPROVEMENT IN STEAM-PLOWS.

Specification forming part of Letters Patent No. 21,661, dated October 5, 1858.

*To all whom it may concern:*

Be it known that I, JAMES W. EVANS, of the city, county, and State of New York, mechanical draftsman, have invented a new and useful machine, being a Steam-Plow; and I do hereby declare that the following is a full, true, and exact description of my said invention and machine, reference being had to the drawings accompanying and making part of this my specification.

Figure I represents a side elevation of the machine. Fig. II represents a top view or plan. Fig. III represents a section of one of the plow-guides and of one of the slides or movable cam-pieces moving in the guide, and by which the plow is kept on the proper track. Fig. IV represents the two plow guides or shoes to which the plows are attached. Fig. V represents the parts by which the two plows are connected, so as to be operated upon by the same driving-rod, L'. Fig. VI is an end elevation of the guide pieces or supports, and of two of the upright adjustable rods to which they are secured, and of the crank which communicates the motion to the plows.

In all the figures like letters represent like parts.

The nature of my invention consists, first, in the arrangement and combination of the main axle and driving-wheels of the machine with the crank that drives the plows and crank-axle and connections therewith, so that the steam-pistons operate the plow and move the machine at the same time; second, in an arrangement for guiding the plow when cutting the furrows, and drawing it back clear of the furrow for the next stroke, and for securing the plow strongly, and at the same time allowing it, while cutting the furrow, the requisite vibratory or irregular motion which plowing requires.

The main frame for the support of the machinery is constructed strongly of iron, and is seen in the drawings, Figs. I and II, at A A A A'. The forward part of the frame A' is made lower than the after or main part, and the two are firmly and strongly united at *a a*. The upright boiler and smoke-pipe and fire-box are upon the forward or lower frame, as shown by B. Behind the boiler is seen the water-tank and wood-box, and the semicircular space within for the fireman or engineer, and is represented in outline at C; but as these are to be made in a manner much as is usual and convenient for compactness and strength, they need not be particularly described.

The principal weight of the machine rests upon the two large driving-wheels D D toward either side of the frame. The axle E of these wheels, and to which they are fast, extends out at one end beyond the wheel and passes through the two side connecting-arms, F F, and into journal *f*, in which the axle turns. The frame A rests upon journal-boxes and pillow-blocks or pedestals fast to the under side of the frame above, and resting upon the axle E below.

G is a crank-axle running across the under side of the frame behind the wheels, having attached to it the cranks H H and the crank I for operating the plow. Upon the axle G is also fixed the bevel-toothed wheel K, geared into the bevel-toothed wheel L, which is fast to the strong screw-shaft M, turning in brackets firmly and strongly fastened to the under side of the frame. Upon this screw-shaft M is the endless screw-thread N, operating into a toothed wheel, O, underneath and fast upon the main axle E.

P P are two supports having guide-channels *p p*, Fig. VI, in which the plows are kept in the right direction. They are capable of being moved vertically up and down by means of the four upright rods Q' Q' Q Q, to which they are fast. These rods slide in holes or bushes *q q* in the main frame. Across the frame, in suitable bearings R R, is a rock-shaft, S, to which is fast the arm T, connected at the opposite end to the shaft U of the eccentric V, fast upon the axle G.

Upon the rock-shaft S, and at right angles to arm T, is fast the arm W, the opposite end of which arm W works into a cross-head, X, keyed to the two longer rods Q' Q'. The last-described contrivance and the connections thereof are for lifting and lowering the guides and the plows working in them. The plows (a pair) are seen at Y Y. They are arranged to cut two furrows, the one by the side of the other; but one plow is arranged slightly in advance of the other. The two plows are connected to each other by a swivel-piece, *g'*, Fig.

V, one end of which is fast to a plate, $g''$, Fig. V, secured upon the guide pieces or shoes of one of the plows, the other end of the swivel-piece working in and secured to the end of an arm, $g'''$, projecting forward from and working on a pin fast in the plate $g''''$, attached to the shoe or guide-piece of the other plow.

Upon the two plows, at their heads, on either side, are placed the two ear-shaped traveling pieces or shoes $g\ g$, Figs. III and IV, which fit and slide in the channels of the guide-pieces P P. Upon the swivel $g$, which connects the two plows together, works one end of the driving rod or pitman $L'$, the other end of which is connected to the end of crank I by a pin, upon which it works, and by which it is connected to crank I. The other end of the driving-rod $L'$ is made with an open joint or jaws, so as to be readily fixed to the pin connecting the two plows or disengaged from them by raising this end of it off from the pin.

At the end of one of the supports or guides P is placed a wheel, 2, which turns upon a pin or axle fast to the guide-piece. This wheel 2 serves as a support to the part of the movable frame which supports the plows and adapts the plows to the irregularities of the ground.

Upon the side of the main frame $A'$ and directly in front of the plows is placed the strong lever U or arm $3'$, which is made to turn upon the pin $4'$. Fast to the frame, at the lower end of 3, is placed a pair of cutting-wheels, 4 4, having sharp beveled edges, the axle of the two wheels turning in journals 5 in the arm. The object of the cutting-wheels is to cut the sod and earth, so as to make the work of the plows following after more easy. The arm may be turned on the pin, so as to lift the cutters or wheels from the ground when not required to be in operation.

Underneath the front part of main frame $A'$ is the guide and steering wheel 6, the axle of which turns in journal-boxes in two brackets or arms, 7, on either side, upon which the weight of the frame rests, the two brackets or arms 7 being connected together by a cross frame or head and the head turning upon a pin or pivot fast to the underside of the frame. Upon the front part of this cross-piece is placed a segment of a circular rack, 8, which works the toothed wheel 9, having a long axle, 10, extending up through the platform, and having a head-stock or wheel, 11, by which it is turned in either direction, and by the operation of which the machine is turned and directed in its course.

Upon the sides of the main frame A A are fixed and firmly braced bracket-arms 12 12, one on each side of the machine. These arms or brackets have each two strong plates, 13, on the under side of the arms, projecting forward and at right angles to the arms, between which are placed the oscillatory steam-cylinders 14 14, having gudgeons working in the brasses in the plates 13. These cylinders have connections with the steam chest and boiler, and are provided with valves in the manner common to steam-engines, and need not be particularly described. The pistons of the cylinders have each a piston-rod, which extends through each head of the cylinder through packing-boxes. The piston-rods are extended through the cylinder for the purpose of giving greater bearings and steadiness to the piston-rods when in operation. The piston-rods are connected each to one of the two cranks H H by which (steam being let into the cylinders) the machine is operated. The cranks H are placed at right angles to each other for the more easily passing the dead-points.

The driving-wheels D D are made polygonal, for the purpose of taking hold of the ground at the angles. By the arrangement of the toothed wheels K and L and the screw N, as hereinbefore described, the motion of the wheels D D, and consequently the progress of the machine, is reduced to the one-third of the length of the stroke of the plow, crank I being so proportioned to the length of the cranks H H as to allow the plows to cut two-thirds of the diameter of the crank revolution.

What I claim as my invention in the above-described machine, and for which I desire Letters Patent, is—

1. The combination and arrangement of the main shaft G and cranks H I, forming part thereof, with the main axle E and driving-wheels D, by means of screw-shaft M, and the bevel wheels K and L, and the screw-thread N upon the axle, so that by the action of the piston-rod 15, attached to crank H, the reciprocating action is communicated to the plows Y Y, and at the same time the machine is moved forward in due proportion to the stroke of the plows by the rotation of wheels D, and thereby cutting a continuous furrow by a rectilinear and direct thrust of the plow or plows.

2. The construction and arrangement of the supports or guide-pieces P P, the pairs of vertical rods Q Q Q' Q', operating by means of the eccentric V, and the lever and arm T W, in the manner described, for guiding, securing, elevating, and lowering the plows.

JAMES W. EVANS.

Witnesses:
J. B. STAPLES,
G. W. FOX.